Feb. 7, 1967 R. C. L. JACOBS 3,302,436

METHOD OF FORMING TREADWAY

Original Filed March 12, 1962

INVENTOR:
ROBERT C. L. JACOBS
BY
ATT'Y

Feb. 7, 1967  R. C. L. JACOBS  3,302,436
METHOD OF FORMING TREADWAY
Original Filed March 12, 1962  2 Sheets-Sheet 2
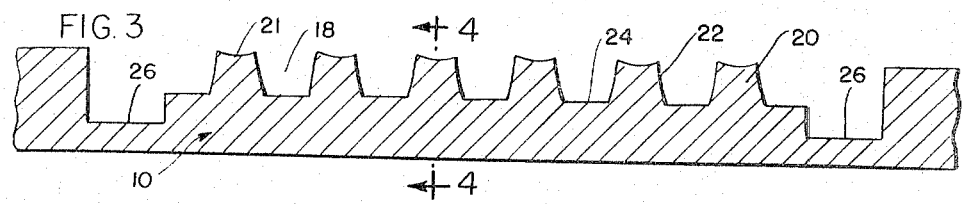
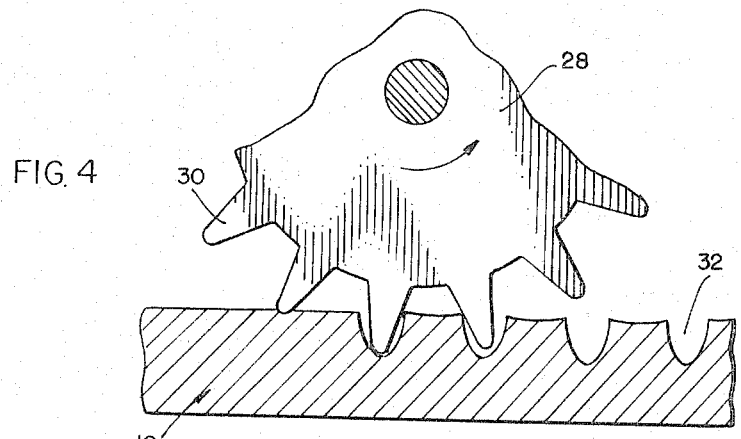
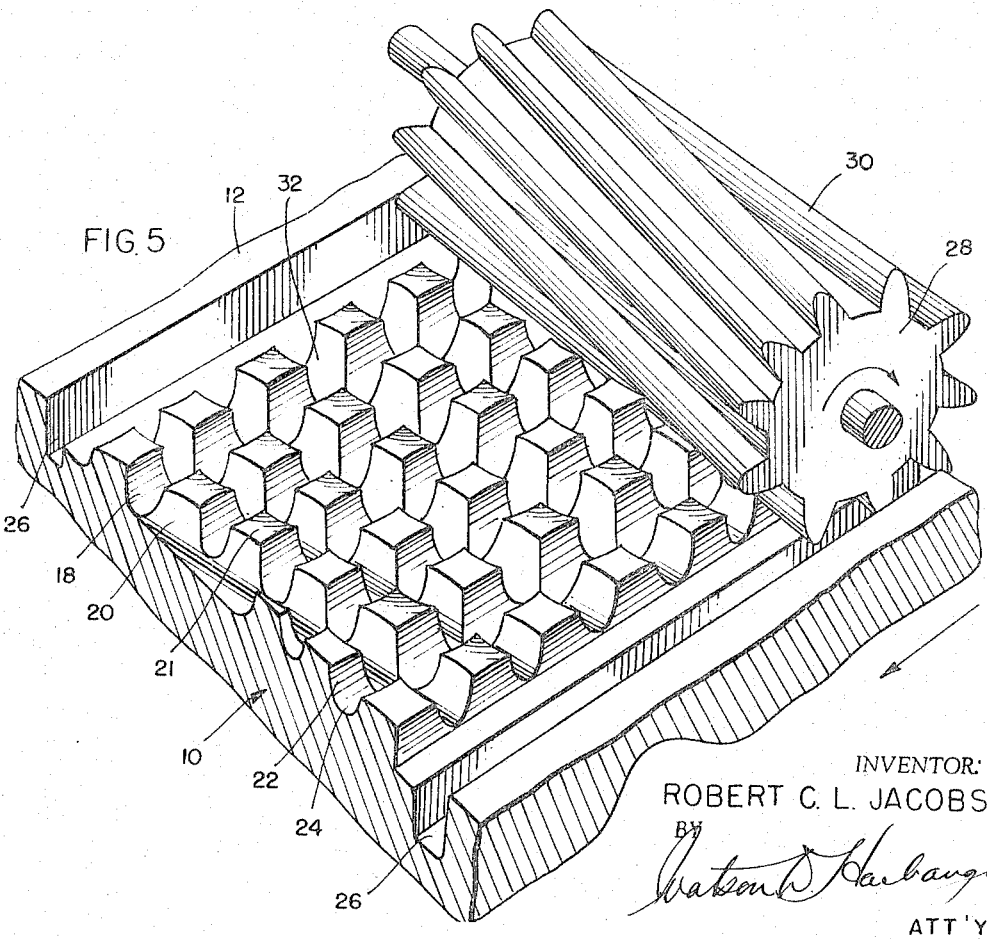
INVENTOR:
ROBERT C. L. JACOBS
BY
ATT'Y under# United States Patent Office 3,302,436
Patented Feb. 7, 1967

3,302,436
METHOD OF FORMING TREADWAY
Robert C. L. Jacobs, East Peoria, Ill., assignor to Wahlfeld Mfg. Company, Peoria, Ill., a corporation of Illinois
Original application Mar. 12, 1962, Ser. No. 179,150, now Patent No. 3,172,343, dated Mar. 9, 1965. Divided and this application Nov. 18, 1964, Ser. No. 412,098
5 Claims. (Cl. 72—256)

This invention relates in general to treads and in particular to an anti-skid treadway and method of forming a treadway integral with an extruded metallic member, for use in areas frequently traversed, to improve the co-efficient of friction between the treadway and a contacting surface to eliminate slippage.

This application is a division of application Serial No. 179,150 filed March 12, 1962 now United States Pat. 3,172,343, dated March 9, 1965.

The treadway of this invention finds its greatest utility on thresholds such as shown in application Serial No. 1,500, now Wahlfeld Patent No. 3,079,652 issued March 5, 1963, reference to which is hereby made, stair steps, inclined surfaces and other areas where the possibility of slippage is prevalent and is known to be the cause of a considerable number of accidents and subsequent injury to the body. Further, the treadway of this invention finds use not only where there are slippery floors or surfaces, but in diversified industries such as airlines, passenger trains, bakeries, textile weaving, where slippage might be a bar to safety and efficiency.

The concept of providing additional frictional portions to thresholds, stair steps and other areas for safety purposes is quite old in the art and is frequently found installed in the more modern home, building, factories and equipment. This invention is directed to a novel method of forming an improved treadway as an integral portion of an extruded metallic member.

A specific object of this invention is to provide an improved anti-slip treadway integrally formed in an extruded metallic member which presents a plurality of truncated pyramids each having an upper concaved surface, the bordering edges thereof being raised for engagement with a contacting surface.

A further object of this invention is to provide a novel method of forming an improved anti-skid treadway wherein teeth of a rotating gear member are embedded into an extruded metallic member having channels formed therein to form a plurality of grooves angularly disposed to the direction of the channels.

Among the other objects of this invention is the provision of an improved treadway which is readily formed in a contoured extruded metallic member requiring only subsequent cutting to proper size and is extremely rugged in configuration, simple in design and economical to manufacture.

The features of the present invention which are believed to be novel are set forth with particularity in the appended claims. The formation and the method of formation of the invention, together with further objects and advantages thereof, may best be understood by reference to the following description taken in connection with the accompanying drawings, and the several figures of which like reference numbers identify like elements, and in which:

FIG. 3 is a sectional view of the treadway portion of an extruded metallic part illustrating the channel formation and the relationship of the truncated pyramids as formed thereon;

FIG. 4 is a fragmentary sectional view illustrating the relationship of the rotary gear member utilized to form a plurality of spaced grooves at right angle to the channels of the extruded metal member as shown in FIG. 3; and FIG. 5 is a fragmentary view in front perspective of a gear member forming grooves in angular relationship to channels in an extruded metal member.

By way of generalization for a better understanding of the detailed description to follow, the treadway surface formed by the method of this invention is primarily characterized by the presentation of a plurality of truncated pyramids formed at spaced intervals having the upper surface thereof concaved in configuration whereby the bordering edges will be in a raised position for engagement with a contacting surface to increase co-efficient of friction and prevent slippage.

Another salient feature of this invention is the method of forming a treadway as an integral portion of an extruded metallic member whereby cross grooves are formed at a depth equal to channels in the extruded member in such a manner as to provide a plurality of spaced apart truncated pyramids.

It is to be understood that although the usual method of forming a treadway is described and illustrated in conjunction with a threshold for a doorway the method of formation is applicable in substantially every area where a safety frictional tread surface is desired.

Figure 1:
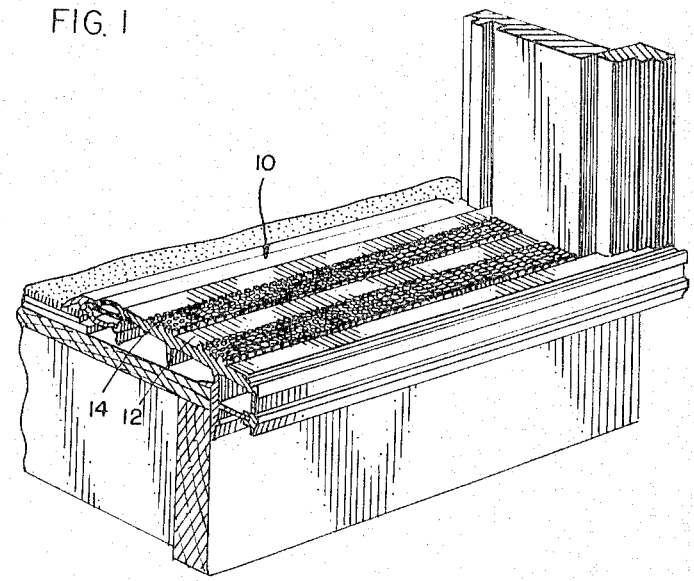
FIG. 1 is a fragmentary, partially sectioned view in front perspective, illustrating the relationship of the treadway of this invention in conjunction with a threshold assembly in a building structure.
Figure 2:
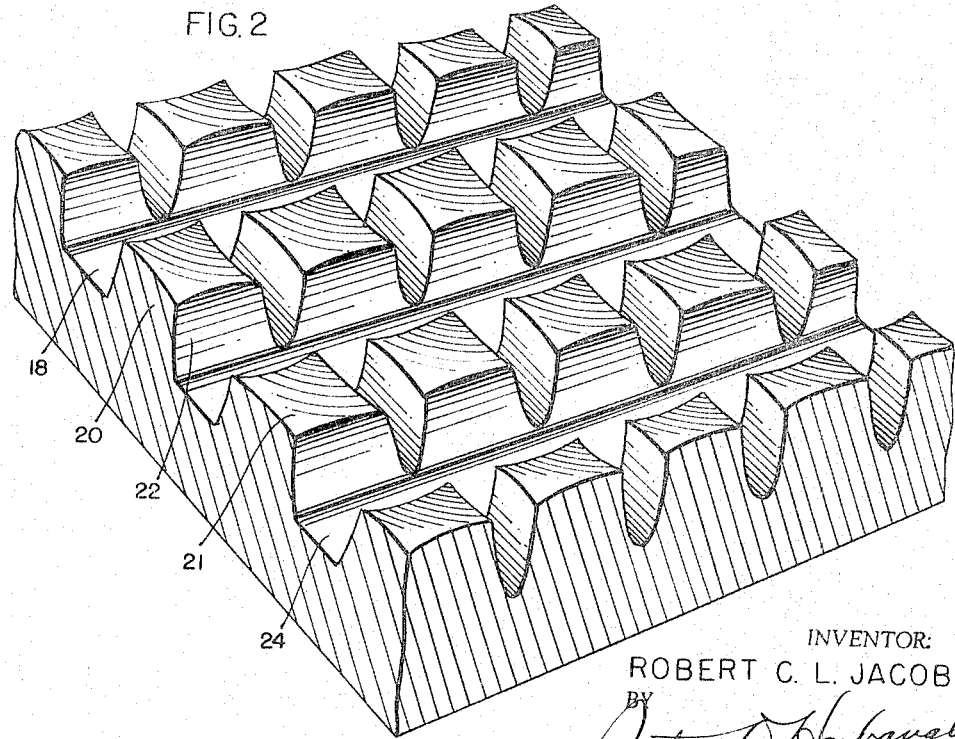
FIG. 2 is an enlarged fragmentary sectioned view in front perspective illustrating the contour and relationship of the plurality of truncated pyramids formed by the method of this invention to provide an improved treadway.

Referring now to the drawings, particularly to FIGS. 1 and 2, the treadway of this invention is illustrated as a portion of a threshold 10 for a conventional doorway in a home or building. The threshold 10, preferably formed from an aluminum alloy, provides a forward or outer downwardly sloping surface 12 which is provided with the treadway 14 formed by the method of this invention. It being readily understood that the treadway portions are formed at predetermined intervals to insure a greater area for surface contact with the foot and that the number and spacing of the treadway portions will vary depending on the overall depth of the surface 12.

The treadway 14, as best seen in FIGS. 2 and 3, is made up of a plurality of truncated pyramids 16. The threshold 10, being a unitary piece formed by a conventional extrusion method, provides a series of channels 18 with intermediate lands 20. Side walls 22, interconnecting the channels and lands, are preferably contoured and angled outwardly away from the lower surface 24. The contour of the channels 18 and lands 20 have the corner juncture of the side walls 22 and the top wall 21 of the lands 20 slightly raised to give the top wall 21 a concaved configuration. Recessed channels 26 are provided on both sides of the treadway to provide the necessary clearance for the formation of grooves in the lands 20 as will now be explained.

Referring now briefly to FIG. 4, the metallic member 10, upon leaving the extrusion forming equipment, is either formed while at the high extrusion temperature level or subsequently cold worked at lower temperatures by a gear member 28, positioned directly above the extruded member and adjusted to permit spaced apart teeth 30 to engage and embed into the lands 20 to a depth equal to the depth of the channels 18, rotated in timed relationship to the feed of the extruded member. The gear 28 has a width equal to the total width of all the lands of the treadway portions and forms a series of grooves 32 intersecting the channels 18.

As the rotary gear 28 engages the lands 20, the forming action of the successive teeth 30 as they enter and leave the lands 20, forms the sides of grooves 32 and simultaneously builds up the metal adjacent the upper surface on each side of each of the tread members. Thus, the upper surface 21 of the now formed truncated pyramids, has its peripheral edges raised with the upper surface having a concaved configuration.

The peripheral borders of the upper surface of the truncated pyramids actually function as knife edges as pressure of the foot is forced against these knife edges, any possibility of ice formation will be broken permitting the individual edges to actually embed or contact the sole of a shoe.

It is readily understood by those skilled in the art, that the method of forming the preheated metallic member as it leaves the extrusion machinery provides not only the formation of the grooves in angular relationship to the channel, but permits a build up of the peripheral upper edges and work hardens the surfaces which eliminates an additional tempering process.

The grooves intersecting the channels are formed to the depth of the channel which in conjunction with the overall downward slope of the threshold permits drainage and facilitates cleaning of the entire threshold.

Thus, having described the actual formation of the treadway and the method of forming the treadway by embedding teeth of a gear in a preheated extruded member, the advantage and objects of this invention as set forth above are readily apparent. The plurality of raised peripheral edges of the truncated pyramids provide a position gripping surface for contact with the foot at all times and is extremely rugged in construction, easily maintained and economical to manufacture.

It will, of course, be understood that various changes may be made in the form, details, arrangement and proportion of the parts without departing from the scope of the invention which consists of the structure shown and described herein as set forth in the appended claims.

What is claimed is:
1. The method of forming a treadway in a member comprising the steps of:
   (1) extruding said member to form a plurality of spaced elongated channels in a surface thereof with lands between said channels having flat top surfaces, and
   (2) progressively forming a plurality of spaced grooves at an elevated temperature and transversely across said lands angularly intersecting said channels and working up the side walls of adjacent grooves to form a plurality of upstanding spaced treads between said intersections having concave top surfaces.

2. The method in accordance with claim 1 in which said spaced grooves are formed sequentially from end to end across said lands and adjacent grooves in each land are formed by compression and building up the side walls to form said concave top surfaces with work hardened corners.

3. The method in accordance with claim 1 in which said spaced grooves are formed by rolling contact of said lands with a series of spaced groove-forming elongated teeth angularly disposed to the longitudinal axis of said lands, whereby adjacent teeth simultaneously form the grooved sides and build the edges of each upstanding tread along said lands.

4. The method in accordance with claim 3 in which said spaced grooves are formed by rolling compression contact of said lands with successive elongated angularly disposed teeth of a rotatable gear to a depth substantially equal to the depth of said grooves.

5. The method of forming a treadway in a metallic member which comprises the steps of
   (1) extruding said metallic member to form a plurality of spaced elongated channels in a surface thereof with lands between said channels having flat top surfaces,
   (2) progressively forming a plurality of spaced grooves at an elevated temperature in the flap top surfaces of said lands and angularly intersecting said channels by rolling compression contact of said lands with successive elongated angularly disposed teeth of a rotatable gear to a depth substantially equal to the depth of said channels, whereby said spaced grooves are formed sequentially from end to end across said lands and adjacent grooves are formed by simultaneous compression across the lands and building up the side walls to form therealong a plurality of upstanding spaced truncated pyramidal treads having concave top surfaces with raised work-hardened peripheral edges.

References Cited by the Examiner
UNITED STATES PATENTS

| | | | |
|---|---|---|---|
| 409,049 | 8/1889 | Lewis | 72—366 |
| 1,615,094 | 1/1927 | McFarland | 72—256 |
| 2,716,805 | 9/1955 | Reed | 72—256 |

RICHARD J. HERBST, *Primary Examiner.*

L. A. LARSON, *Assistant Examiner.*